(12) United States Patent
Kellner et al.

(10) Patent No.: US 11,611,121 B2
(45) Date of Patent: Mar. 21, 2023

(54) MOTOR VEHICLE TRACTION BATTERY MODULE

(71) Applicant: Dr. Ing. h.c. F. Porsche Aktiengesellschaft, Stuttgart (DE)

(72) Inventors: Philipp Kellner, Rennigen (DE); Christopher Volkmer, Niefern-Öschelbronn (DE); Sascha Mostofi, Zeltingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 126 days.

(21) Appl. No.: 17/153,003

(22) Filed: Jan. 20, 2021

(65) Prior Publication Data

US 2021/0226281 A1 Jul. 22, 2021

(30) Foreign Application Priority Data

Jan. 21, 2020 (DE) ...................... 10 2020 101 260.8

(51) Int. Cl.
*H01M 10/6556* (2014.01)
*B60L 50/64* (2019.01)
(Continued)

(52) U.S. Cl.
CPC ......... *H01M 10/6556* (2015.04); *B60L 50/64* (2019.02); *B60L 58/26* (2019.02);
(Continued)

(58) Field of Classification Search
CPC ........... H01M 10/6556; H01M 10/613; H01M 10/625; H01M 10/6567; H01M 50/249;
(Continued)

(56) References Cited

U.S. PATENT DOCUMENTS

2012/0129030 A1 5/2012 Lim
2013/0052506 A1 2/2013 Gutsch et al.
(Continued)

FOREIGN PATENT DOCUMENTS

CN 102623651 A 8/2012
CN 102804451 A 11/2021
(Continued)

OTHER PUBLICATIONS

Chinese Office Action for Chinese Application No. 202011424177. 6, dated Oct. 10, 2022 with translation, 12 pages.

*Primary Examiner* — Karie O'Neill Apicella

(74) *Attorney, Agent, or Firm* — RatnerPrestia

(57) ABSTRACT

A motor vehicle traction battery module includes a rigid battery module housing having at least one battery element. The battery module housing has at least one planar and liquid-cooled housing. The liquid-cooled housing wall has at least one continuously linear coolant cooling channel and at least one continuously linear empty channel, which is parallel thereto and through which there is no liquid flowing. The liquid-cooled housing wall has a contact-making opening, by means of which exclusively the empty channel is interrupted, and wherein an electrical terminal element is arranged in the region of the contact-making opening, with electrical contact being made with at least one battery element by means of said electrical terminal element.

9 Claims, 3 Drawing Sheets

Figure 1:
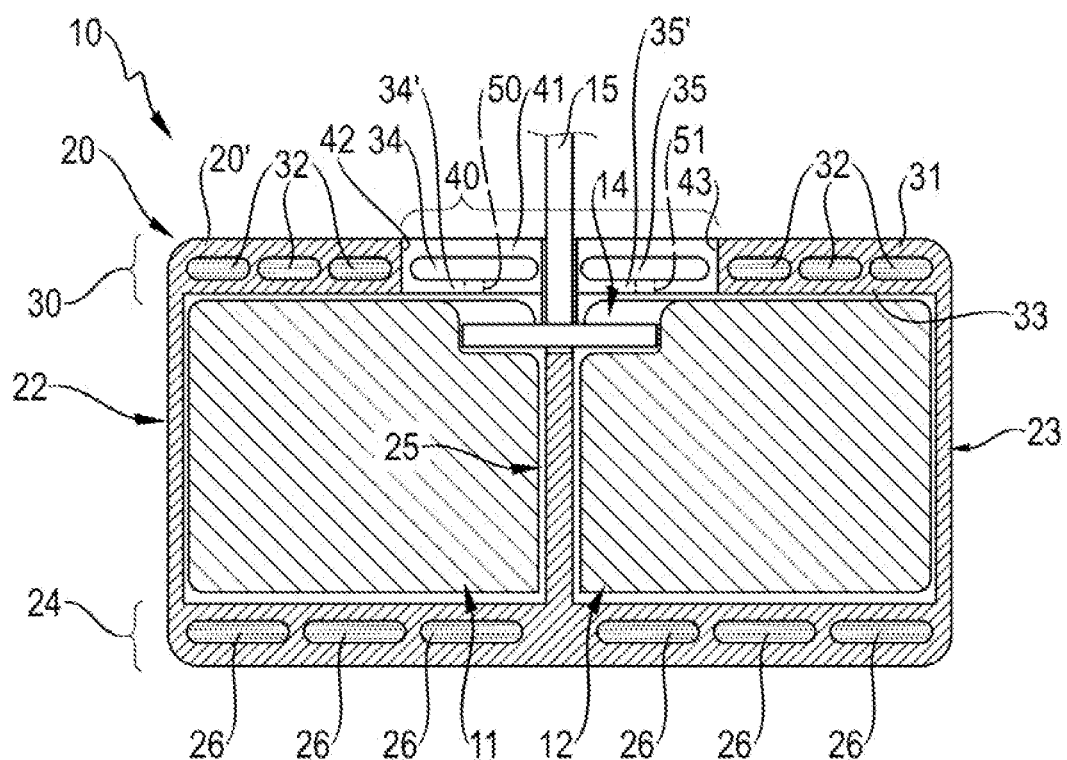

(51) Int. Cl.
    *B60L 58/26*     (2019.01)
    *H01M 50/249*     (2021.01)
    *H01M 10/613*     (2014.01)
    *H01M 10/625*     (2014.01)
    *H01M 10/6567*     (2014.01)
    *H01M 50/296*     (2021.01)
    *H01M 50/367*     (2021.01)
    *H01M 50/291*     (2021.01)

(52) U.S. Cl.
    CPC ....... *H01M 10/613* (2015.04); *H01M 10/625* (2015.04); *H01M 10/6567* (2015.04); *H01M 50/249* (2021.01); *H01M 50/291* (2021.01); *H01M 50/296* (2021.01); *H01M 50/367* (2021.01); *H01M 2220/20* (2013.01)

(58) Field of Classification Search
    CPC . H01M 50/291; H01M 50/296; H01M 50/367
    See application file for complete search history.

(56) References Cited

U.S. PATENT DOCUMENTS

2017/0077566 A1\*   3/2017   Mascianica ......... H01M 50/507
2019/0165437 A1    5/2019   Kellner et al.

FOREIGN PATENT DOCUMENTS

| | | |
|---|---|---|
| DE | 102018109470 A1 | 10/2019 |
| JP | 2005339932 A | 12/2005 |
| JP | 2016072041 A | 5/2016 |
| JP | 2018041651 A | 3/2018 |

\* cited by examiner

MOTOR VEHICLE TRACTION BATTERY MODULE

CROSS-REFERENCE TO RELATED APPLICATION

This application claims priority to German Patent Application No. 10 2020 101 260.8, filed Jan. 21, 2020, the content of such application being incorporated by reference herein in its entirety.

FIELD OF THE INVENTION

The invention relates to a motor vehicle traction battery module for storing electrical drive energy for a motor vehicle comprising an electric traction drive.

BACKGROUND OF THE INVENTION

Traction battery modules used for motor vehicle traction batteries are those which each have one or more battery elements, which are arranged inside a rigid battery module housing. The battery module housing has a coolant cooling channel in at least one housing wall, with a coolant flowing through said coolant cooling channel which then transports away the heat accumulating in the battery elements.

DE 10 2018 109 470 A1, which is incorporated by reference herein, discloses a traction battery module which accommodates two electrical battery elements and which has two mutually opposite liquid-cooled housing walls, which each have a plurality of coolant cooling channels. A central wall zone which does not have any channels is provided between the coolant cooling channels of a side wall. The two battery elements each have dedicated electrical terminals, which are electrically connected to one another outside the battery module housing.

SUMMARY OF THE INVENTION

Described herein is a motor vehicle traction battery module comprising a stable battery module housing and simple electrical contact-making with the battery elements in the traction battery module housing.

The motor vehicle traction battery module according to aspects of the invention has a rigid battery module housing comprising at least one battery element inside the housing. The battery module housing has at least one planar and liquid-cooled housing wall. The housing wall is preferably the cover housing wall at the top of the preferably right-parallelepipedal battery module housing and/or the housing wall at the bottom which forms the base of the battery module housing, always based on the physical orientation in the state in which it is installed in the motor vehicle.

The liquid-cooled housing wall has at least one continuously linear coolant cooling channel and at least one continuously linear empty channel, which is parallel thereto and through which there is no coolant or any other fluid flowing, but which is generally filled with stationary ambient air. Both the coolant cooling channel and the empty channel extend over virtually the entire length of the liquid-cooled housing wall in question, in particular over at least 90% of the length of the housing wall in question.

The liquid cooling channel or the coolant cooling channels, on the one hand, and the empty channel or the empty channels, on the other hand, are parallel to one another with respect to the channel axes. Although the liquid-cooled housing wall is not directly cooled by the coolant in the region of the empty channel or the empty channels, particularly preferably the stability of the liquid-cooled housing wall in question in the region of the empty channel is not notably weakened since the total thickness of the liquid-cooled housing wall in the region of the empty channel must not be any less than in the region of the cooling channel, but the provision of the empty channel brings with it a weight reduction in comparison with a corresponding zone consisting of solid material. In addition, the empty channel can perform other functions which do not involve any cooling functions. Particularly preferably, the liquid-cooled housing wall has a constant total wall thickness over its entire wall area.

The liquid-cooled housing wall has a contact-making opening, by means of which exclusively the empty channel is interrupted, but none of the coolant cooling channels is interrupted. Since the empty channel does not have a cooling function, it can be interrupted without any problems in order to form access to the housing interior of the battery module housing. An electrical terminal element is arranged in the region of the contact-making opening, with electrical contact being made with the at least one battery element by means of said electrical terminal element. In the simplest case, the terminal element is formed by electrical lines, which produce the electrical connection to the outside of the module and/or the electrical connection between two battery elements. The terminal element can, however, in principle additionally have electrical or electronic component parts, for example electrical switches, sensors etc.

In this way, a light and mechanically stable battery module housing is provided which has a contact-making opening in the region of the empty channel or the empty channels, through which contact-making opening an electrical terminal element can be applied in a simple and easily accessible manner during assembly of the traction battery module after the insertion of the battery element or the battery elements, by means of which electrical terminal element the battery element or the battery elements are electrically connected. In particular in the case of a traction battery module which is cooled above the battery elements, if there is a conflict in terms of physical space the electrical contact can be made with the battery elements favorably from above. This conflict in terms of physical space is resolved by the traction battery module according to aspects of the invention.

Preferably, at least two preferably identical battery elements are provided, which are both electrically connected to the outside world and/or to one another by means of one electrical terminal element. Since the electrical terminal element is easily accessible from the housing outer side through the contact-making opening, the two battery elements can be connected electrically to one another and/or to the outside world in a simple manner and with a low level of installation complexity.

In accordance with a preferred configuration, a separating wall is provided in the housing interior, said separating wall being arranged between two battery elements and physically separating said battery elements from one another. The separating wall is also used for mechanically stabilizing and reinforcing the battery module housing. Particularly preferably, the separating wall is arranged parallel to the longitudinal direction of the cooling channel and/or the empty channel.

Preferably, the separating wall is connected to the liquid-cooled housing wall in the region of the empty channel, and the contact-making opening is provided in the region of the separating wall. The separating wall therefore abuts the liquid-cooled housing wall in the region of an empty channel or between two empty channels, and not in the region of a cooling channel. In this way, access to the two battery element chambers, which are separated from one another by the separating wall, can be provided via the contact-making opening in the region of the empty channel.

In accordance with a particularly preferred embodiment, all of the empty channels are arranged together between in each case at least one cooling channel and particularly preferably are arranged in the center of the wall between in each case at least one cooling channel. The empty channel or the empty channels therefore form, when viewed in the transverse direction with respect to the longitudinal extent of the channels, the central region of the liquid-cooled housing wall in question, whereas the cooling channels in each case form the lateral housing wall regions on both sides of the empty channel(s).

Preferably, a separate ventilation opening is provided in the proximal channel wall of the empty channel, through which ventilation opening the housing interior is ventilated. Ventilation is required in particular for pressure compensation of fluidically isolated air volumes within the battery module housing, which are unavoidable in particular in the case of battery elements which are accommodated in a cell pouch. Thus, for example, an isolated air volume can be provided at both longitudinal ends within a battery element chamber, said isolated air volume being fluidically connected in each case to atmospheric pressure via the correspondingly positioned ventilation opening in the proximal channel wall of the empty channel. A separate pressure compensation solution for the isolated air volumes is no longer necessary.

Preferably, the liquid-cooled housing wall and particularly preferably also one or more further housing walls of the housing is or are formed by a single metal extruded profile body. In order to produce a battery module housing which is enclosed on six sides, in each case corresponding end walls need to be accommodated only at the two end sides. In this way, the battery module housing can be manufactured inexpensively, although it performs a variety of functions and allows a complex structural design.

BRIEF DESCRIPTION OF THE DRAWING FIGURES

Figure 2:
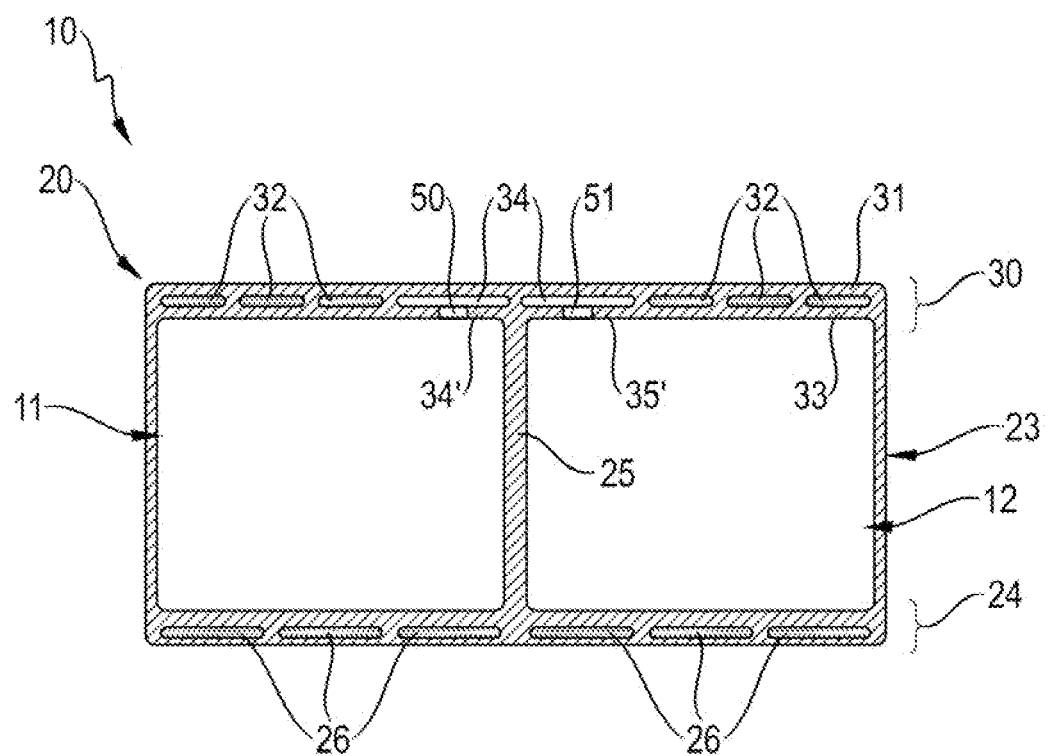
Figure 3:
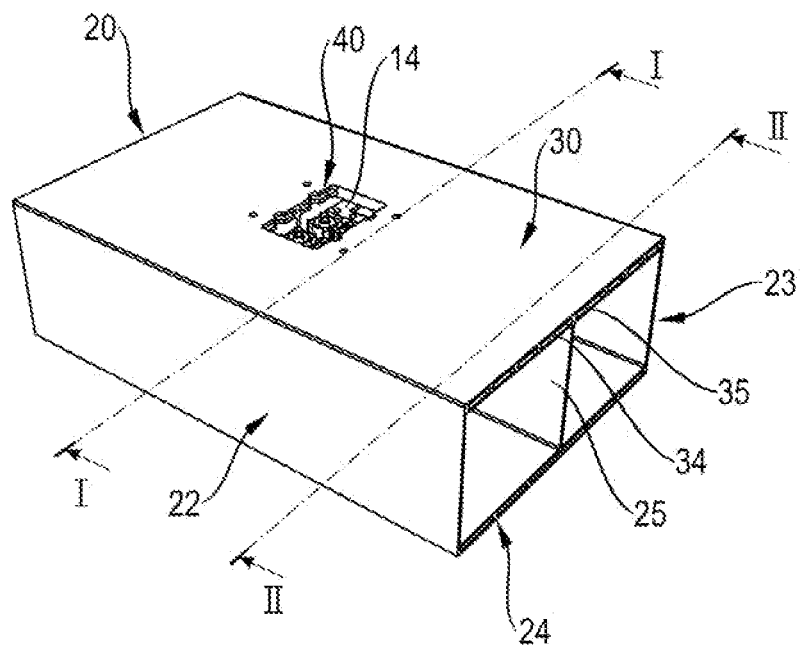
Figure 4:
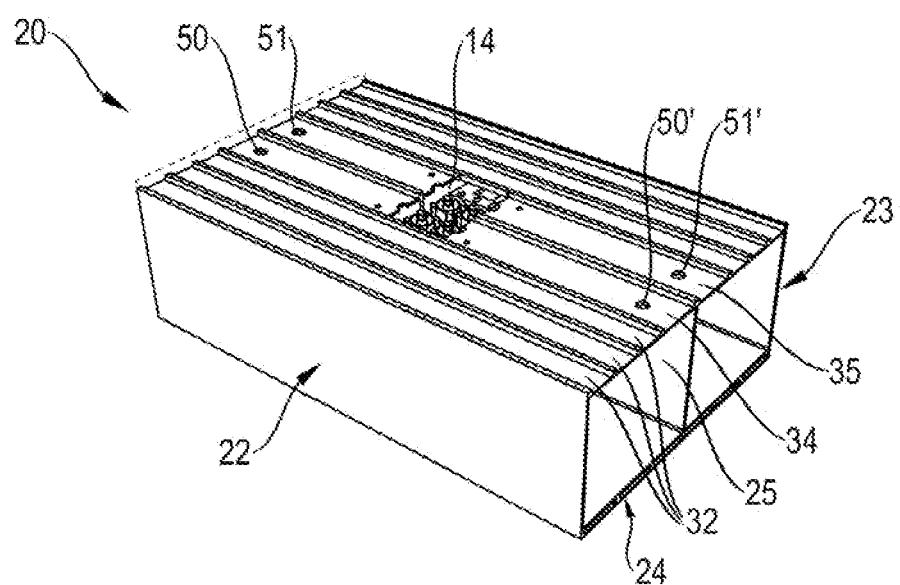

One exemplary embodiment of a motor vehicle traction battery module according to aspects of the invention will be explained in more detail below with reference to the drawings, in which:

FIG. 1 shows a central cross section I-I through a schematically illustrated motor vehicle traction battery module, FIG. 2 shows an eccentric cross section II-II through the motor vehicle traction battery module shown in FIG. 1, FIG. 3 shows a schematic perspective illustration of the battery module housing, which is open on the longitudinal side, of the traction battery module shown in FIGS. 1 and 2, and FIG. 4 shows a perspective illustration of the battery module housing shown in FIG. 3 without any distal channel walls of the upper housing wall.

DETAILED DESCRIPTION OF THE INVENTION

FIGS. 1-4 show schematic illustrations of a high-voltage motor vehicle traction battery module 10 comprising a rigid battery module housing 20. The battery module housing has a right-parallelepipedal shape and has six planar walls, namely a partially liquid-cooled upper housing wall 30, a lower housing wall 24 which is liquid-cooled over the entire area, two side walls 22, 23 and two end walls (not illustrated), which enclose the battery module housing 20 in fluid-tight fashion at each end.

The upper housing wall 30, the lower housing wall 24 and the two side walls 22, 23 are formed from a single metal extruded profile body 20', whereas the two end walls are connected, for example adhesively bonded or welded, in liquid-tight fashion to the extruded profile body 20'.

The interior of the battery module housing 20 is divided into two battery chambers of equal size by a centrally arranged separating wall 24, wherein in each case one high-voltage battery element 11, 12, which is surrounded in each case by a flexible cell pouch, is arranged in each battery chamber. The separating wall 25 is in a parallel plane with respect to the two side walls 22, 23.

The liquid-cooled housing wall 24 at the bottom has a plurality of coolant cooling channels 26, which extend in the longitudinal direction and are arranged parallel to one another, and by means of which the lower housing wall 24 can be cooled homogeneously. The liquid-cooled housing wall 30 at the top has, to the side of a central region, in each case three cooling channels 32 extending in the longitudinal direction, and, in a central region, two empty channels 34, 35 next to one another and likewise extending in the longitudinal direction. The two empty channels 34, 35 are therefore both arranged in the center of the wall and between in each case three cooling channels 32 arranged to the side of the center. The channels 32, 34, 35 in the upper liquid-cooled housing wall 30 are formed by a proximal wall part 33 and by a distal wall part 31 of the housing wall 30, which are connected to one another by corresponding vertical connecting webs.

The upper liquid-cooled housing wall 30 has a contact-making opening 40 in the center, in relation to the two physical directions in the horizontal plane, wherein the housing wall 30 is completely open in this region owing to the contact-making opening 40, with the result that access to the interior of the battery module housing 20 is provided. The rectangular contact-making opening 40 is defined by four opening edge faces 41, 42, 43, of which only three faces are illustrated in FIG. 1.

An electrical terminal element 14 is arranged vertically below the housing opening 40, by means of which electrical terminal element the two battery elements 11, 12 are connected electrically to one another and electrically to the outside via an electrical connecting line 15 in this region. In addition, the in total four formed empty channel sections are fluidically connected to the surrounding atmosphere via the contact-making opening 40.

The proximal channel walls 34', 35' of the four empty channel sections of the two empty channels 34, 35 have in each case one ventilation opening 50, 51 in the vicinity of the respective end walls, through which ventilation openings the housing interior is also ventilated in these regions close to the end walls. The ventilation openings 50, 51 are used for pressure compensation of the fluidically isolated air volumes occurring in this region.

What is claimed is:

1. A motor vehicle traction battery module comprising:
   a rigid battery module housing defining a hollow interior region and having at least one planar and liquid-cooled housing wall surrounding the hollow interior region,
   at least one battery element positioned within the hollow interior region of the housing, wherein the liquid-cooled housing wall has (i) at least one continuously linear coolant cooling channel and (ii) at least one continuously linear empty channel that is parallel to the continuously linear coolant cooling channel and through which no liquid flows, wherein the liquid-cooled housing wall has a contact-making opening, by way of which exclusively the empty channel is interrupted, and wherein an electrical terminal element is arranged in the region of the contact-making opening, with electrical contact being made with at least one battery element by said electrical terminal element, and the electrical terminal element is further arranged within the hollow interior of the housing and at a location beneath the at least one continuously linear empty channel.

2. The motor vehicle traction battery module as claimed in claim 1, further comprising at least two battery elements that electrically contact the electrical terminal element.

3. A motor vehicle traction battery module comprising:

a rigid battery module housing having at least one planar and liquid-cooled housing wall, at least one battery element positioned within an interior of the housing, wherein the liquid-cooled housing wall has (i) at least one continuously linear coolant cooling channel and (ii) at least one continuously linear empty channel that is parallel to the continuously linear coolant cooling channel and through which no liquid flows, wherein the liquid-cooled housing wall has a contact-making opening, by way of which exclusively the empty channel is interrupted, and wherein an electrical terminal element is arranged in the region of the contact-making opening, with electrical contact being made with at least one battery element by said electrical terminal element, wherein the battery module housing has a separating wall that is arranged in the interior of the housing between two battery elements of the at least one battery element.

4. The motor vehicle traction battery module as claimed in claim 3, wherein the separating wall is arranged parallel to a longitudinal direction of the cooling channel and the empty channel.

5. The motor vehicle traction battery module as claimed in claim 3, wherein the separating wall is connected to the liquid-cooled housing wall in a region of the empty channel, and the contact-making opening is provided in a region of the separating wall.

6. The motor vehicle traction battery module as claimed in claim 1, wherein all of the empty channels are arranged together between two cooling channels of the at least one cooling channel.

7. The motor vehicle traction battery module as claimed in claim 6, wherein all of the empty channels are arranged in a center of the liquid-cooled housing wall.

8. The motor vehicle traction battery module as claimed in claim 1, wherein the liquid-cooled housing wall and a plurality of housing walls of the rigid battery module housing are formed by a single metal extruded profile body.

9. The motor vehicle traction battery module as claimed in claim 1 further comprising a ventilation opening disposed in a proximal channel wall of the empty channel, through which ventilation opening the housing interior region is ventilated.

* * * * *